United States Patent [19]

Channel

[11] 4,126,189
[45] Nov. 21, 1978

[54] FOLDING TOOL CARRIER

[75] Inventor: Glenn L. Channel, Loveland, Ohio

[73] Assignee: Graber Industries, Inc., Hutchinson, Kans.

[21] Appl. No.: 761,251

[22] Filed: Jan. 21, 1977

[51] Int. Cl.² ............................................. A01B 51/04
[52] U.S. Cl. .................................... 172/456; 172/458; 172/484
[58] Field of Search ............... 172/311, 456, 459, 460, 172/458

[56] References Cited

U.S. PATENT DOCUMENTS

| 3,593,805 | 7/1971 | Rau | 172/456 |
| 3,797,580 | 3/1974 | Roth | 172/311 |

FOREIGN PATENT DOCUMENTS

| 1,274,266 | 9/1961 | France | 172/456 |

OTHER PUBLICATIONS

German Printed App. No. 2,411,489, Rau, 9/25/75.

*Primary Examiner*—Richard J. Johnson
*Attorney, Agent, or Firm*—Frank C. Lowe; Horace B. Van Valkenburgh

[57] ABSTRACT

A folding tool carrier to be attached to a tractor and to carry an array of cultivating tools or implements. The carrier includes three bars forming a central section and a wing section at each side of the central section. Each wing section is connected to the central section by inner and outer swing arms to function as a parallelogram when the wings are lifted and retracted above the central section. The central section, the wings and the arms, are placed in a common vertical transverse plane to provide for a compact unit which may be carried immediately behind a tractor.

To accomplish this, the inner arms are above and the outer arms are below the central and wing sections when the wing sections are extended. A comparatively short crown bar is mounted upon and above the central section and an inner swing arm is pivotally attached to each end of this crown bar to pivotally connect with the inner end of the adjacent wing section. An outer swing arm is pivotally attached to each end of the central section to pivotally connect to the adjacent swing arm near its outer end. Hydraulic cylinders are mounted upon the crown bar to connect with the inner swing arms to actuate each wing section and to lower the wing to an extended position in alignment with the central section or to raise this wing to a retracted position above the central section.

8 Claims, 13 Drawing Figures

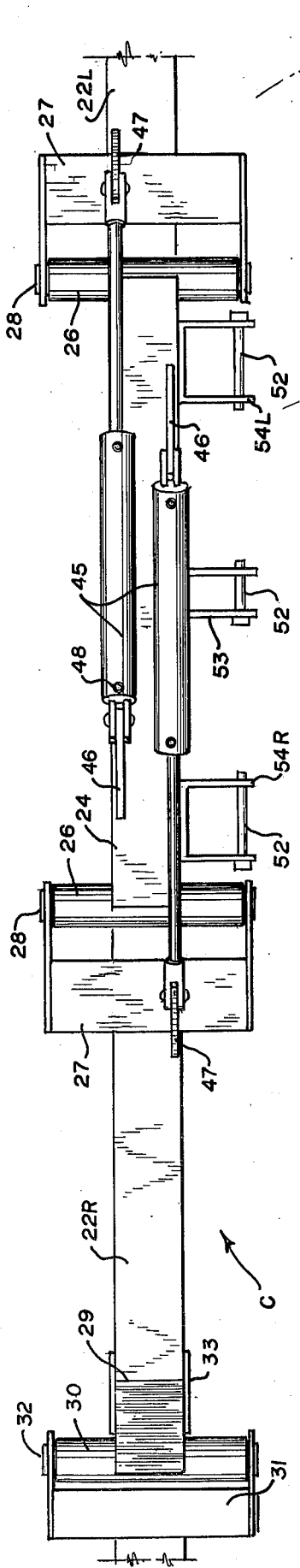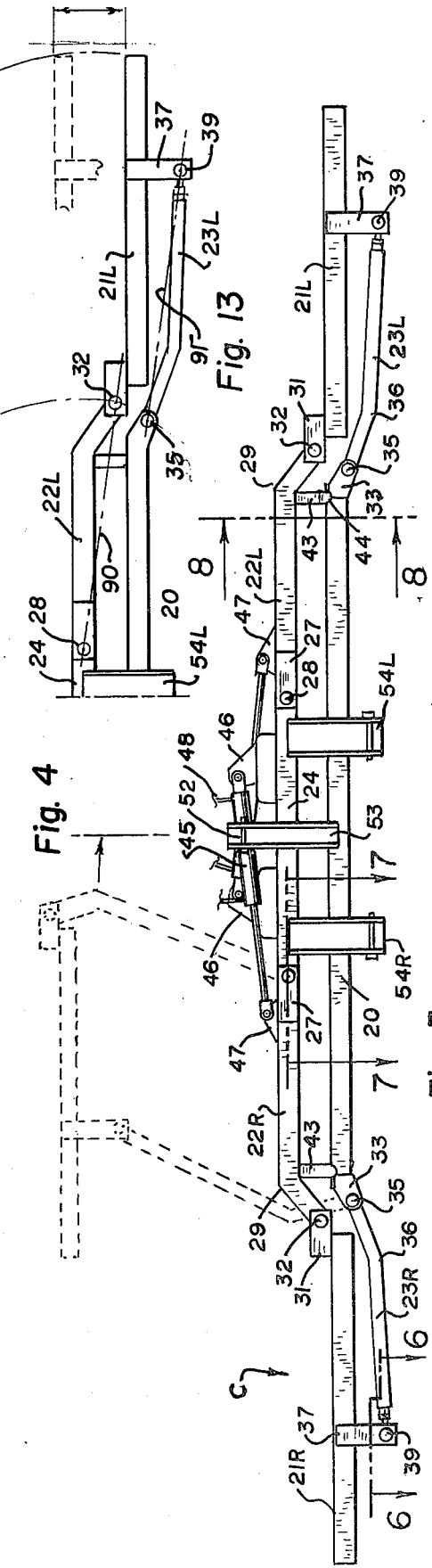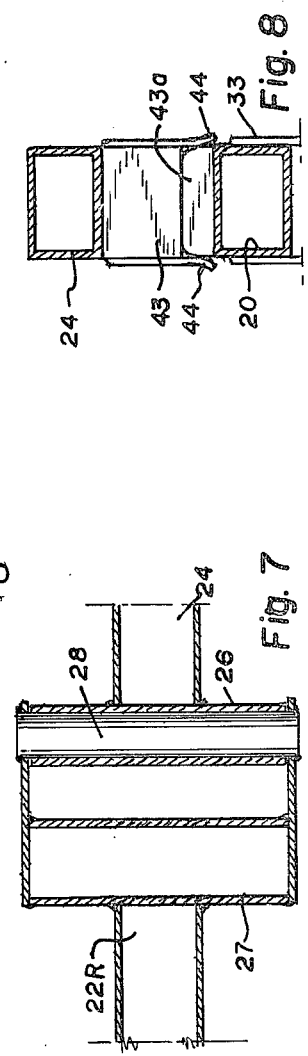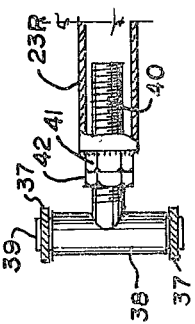

FOLDING TOOL CARRIER

The present invention relates to tool carriers for agricultural implements, or tools, which are attached to field tractors, and more particularly to folding tool carriers.

The development of folding tool carriers commenced with the use of a single tool carrier, a diamond-sectioned bar, attached to the three-point hitch of a tractor to extend transversely behind the tractor. Brackets were provided to attach cultivating implements, or tools, to this bar. Thus, several implements such as plows, chisels or seeders were attached to a single tool carrier bar to plant or cultivate several furrows at a time.

As larger tractors became available, the size of these tool carriers was increased to the point where the transverse span could be as much as forty feet and capable of tilling as many as 16 furrows at a time. As the span of the tool carriers was increased, the bars forming them were changed to heavy square or rectangular sections and in some instances, to truss sections to withstand the weight and the drag of the implements carried upon them. With the larger tool carriers, the lifting capacity of the tractor hitches was exceeded and supplementary lifts were developed to lift implements on the carriers above the ground when they were being transported from one field to another.

The wide, transverse span of these large tool carriers created other problems in transport, and thus tool carriers were developed with foldable wings at each side of a central section. These outward wing sections of the tool carrier were attached to the central section at each side of the tractor, and they could be folded upwardly over the central section to provide a narrower cultivator rig which could more easily be moved from one field to another, through gates and even over roadways. This latter development thus permits a tractor having a wide tool carrier with a large number of cultivating tools, planters, or chemical applicators attached to it to perform various plowing, seeding and cultivating operations in a number of different fields, in a most efficient manner.

The common mode of folding the wings of a tool carrier has been to simply hinge these wings to the central section of the carrier so that they may be folded upwardly to a vertical position. A number of objections have developed with this system. When the tool carrier wings are folded from a horizontal to a vertical position, the mounted implements are rotated to lie on their sides. Whenever seeders or chemical applicators are mounted on the tool carrier wings, it is inevitable that the contents of the hoppers of the seeders or applicators will spill unless each seeder is emptied before folding up the wing. Also, since each cultivator implement projects below the tool carrier, such an upswing of a tool carrier wing to a vertical position, means that the bases of the cultivator implements will extend sidewise and outwardly from the tool carrier to reduce the advantage of compactness for transportation.

In a further improvement, each tool carrier wing was mounted upon inner and outer arms to produce a parallelogram action so the tool carrier wing would swing upwardly and inwardly and over the central section maintaining its horizontal alignment at all times. This overcame the objections to spilling materials out of the hoppers of the seed and chemical applicators and also, a more compact arrangement was obtained, which could move through a narrow opening such as through a gate without the danger of an implement reaching out laterally beyond the central section of the tool carrier. The primary objections to this arrangement was the need for a comparatively heavy trusswork with the implements extended a fair distance behind the three-point connector of the tractor. This increased the force on the three-point hitch whenever the unit was lifted. The tool carrier was unduly heavy and there was a definite need for improvements in a tool carrier of this type.

The present invention was conceived and developed with such a need in view and the invention comprises, in essence, a folding tool carrier with pairs of arms pivotally carrying wing sections at each side of a central section. The arms move the wing sections from an extended position in alignment with the bar forming the central section to a retracted position upwardly, inwardly and above the central section. Each wing section, a portion of the central section and the pair of arms carrying the wing section form a parallelogram to keep the wing section horizontal, or essentially so, when it is being lifted. The improved carrier is arranged with all of these components stacked in a vertical, transverse plane which will be compactly positioned immediately behind the hitch members of a tractor. Relatively long and extra heavy hinges at the inward arm of each wing section more effectively resist the bending stresses and reduce backlash and deflections produced by the resistance of implements mounted on the wing section whenever a cultivation operation is underway. This results in increased planting and cultivating row accuracy. Cylinders to extend and to retract the wing sections may be conveniently mounted at the center of the carrier upon the central section.

It follows that an object of the present invention is to provide a novel and improved folding tool carrier which is formed as a comparatively narrow unit, with the components thereof being stacked, one above the other and in a transverse, vertical plane with respect to a tractor to which the unit is hitched to provide for a compact structure carried closely behind the tractor.

It is important to have the tool carrier and the attached implements mounted closely behind the tractor because, in most cases, the tractor three-point hitch can then lift the tool carrier and implements thereon without the need for cumbersome lift-assist units behind the implements. Moreover, less room is required to turn around at the end of a furrow-irrigated field with a resulting increase in the productive area. Also, ballast weights at the front end of the tractor can be eliminated or minimized to reduce the degree of undesirable soil compaction by the wheels of the tractor.

Another object of the invention is to provide a novel and improved folding tool carrier having wing sections which are lifted upwardly and over the central section of the tool carrier in a manner which places all the components in a compact arrangement with the tools, or implements, on the wing sections remaining upright at all times, all to permit the tool carrier to easily pass through gates and move down a roadway as from one field to another.

Another object of the invention is to provide a folding tool carrier having a simple, neat and rugged arrangement of components.

Another object of the invention is to provide a novel and improved folding tool carrier which may be easily operated by a standard hydraulic system such as is available in tractors.

Another object of the invention is to provide, in a folding tool carrier, an improved quick change connector to permit one man to quickly change implement assemblies, for example, to unhook his tractor from a cultivator implement bar assembly and then hook up to a planter implement bar assembly, or the like, all in a period of 5 minutes or less.

Another object of the invention is to provide a novel and improved folding tool carrier having wing sections which are lifted upwardly and over a central section, and which includes arms interconnecting the wing sections and central sections to effect such lifting, and wherein the pivot points between the arms and the sections are arranged in a parallelogram-like pattern which may be relatively inclined with respect to the alignment of the central and wing sections to obtain an advantageous lift pattern of each wing section with respect to the central section.

With the foregoing and other objects in view, my present invention comprises certain constructions, combinations and arrangements of parts and elements as hereinafter described, defined in the appended claims and illustrated in preferred embodiment by the accompanying drawing in which:

FIG. 3 is a front elevational view of the tool carrier per se with the wing sections extended and with broken lines indicating the position of one of the wings when partially retracted above the central section.

FIG. 4 is a plan view of the tool carrier in the extended position, as shown at FIG. 3, but on an enlarged scale and with wing portions broken away to conserve space.

FIGS. 6, 7 and 8 are fragmentary sectional details as taken from the respective indicated lines 6—6, 7—7 and 8—8 at FIG. 3, but on enlarged scales.

Figure 9:
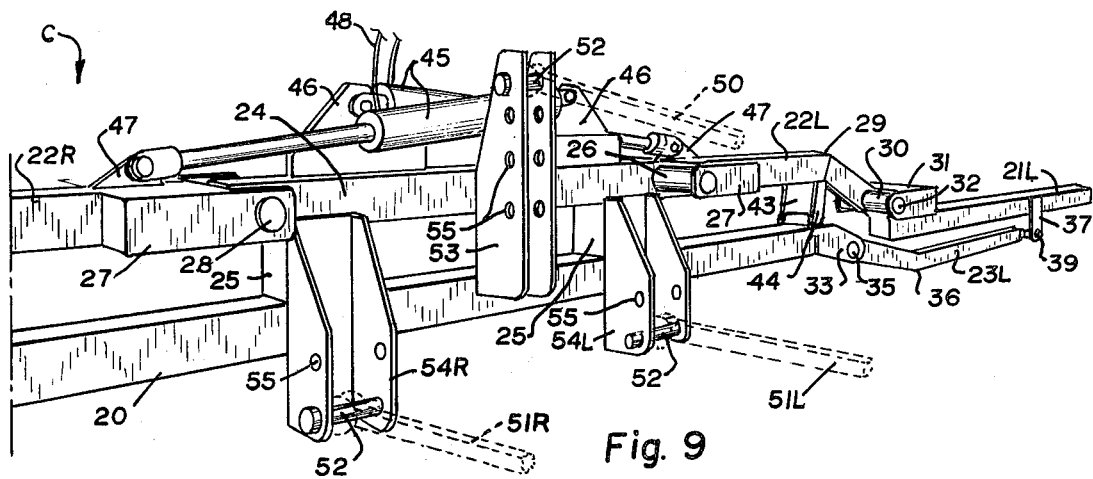

FIG. 9 is a fragmentary perspective view looking at the front of the tool carrier, with one wing section being broken away to conserve space and with broken lines indicating the hitch bars of a three-point tractor hitch which will ordinarily be used to support the tool carrier.

Figure 10:
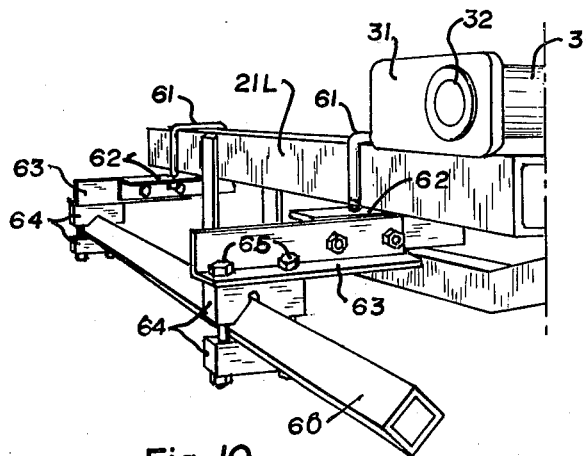

FIG. 10 is a fragmentary perspective view of a wing portion of the tool carrier, but showing the manner in which it may support a diamond-type implement bar.

Figure 11:
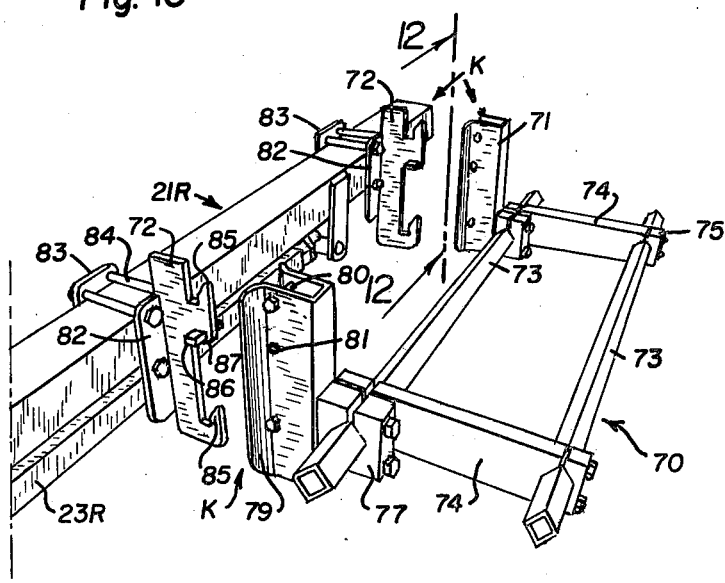

FIG. 11 is a front perspective view showing a wing section of the tool carrier with attachments to support an implement bar assembly, the attachments being separated to better show their structure.

Figure 12:
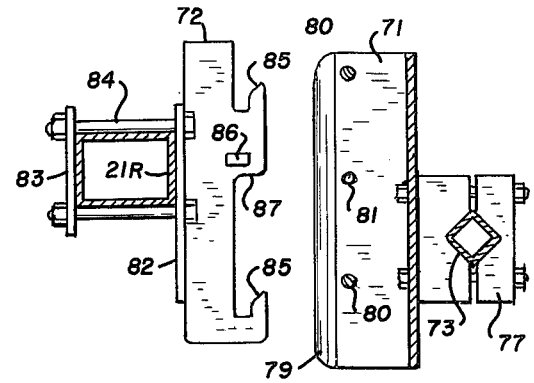

FIG. 12 is a fragmentary sectional detail as taken from the indicated line 12—12 at FIG. 11 to better illustrate the construction of the attachment unit.

FIG. 13 is a diagrammatic front elevational view of a portion of the tool carrier similar to FIG. 3 showing, in dashed lines, an inclined alignment of the pivot points when a wing section is extended and showing, in broken lines, the movement of the inner pivot on the wing and an intermediate position of the wing.

Figure 1:
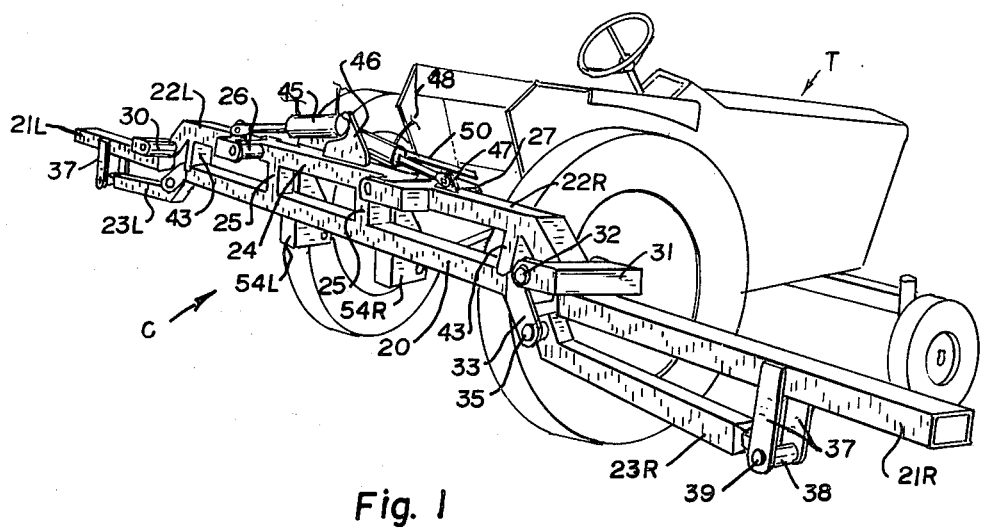
FIG. 1 is a perspective rear view of a tractor with the improved tool carrier mounted thereon and with the wing sections in an extended position.

Referring more particularly to the drawing, the general arrangement of the improved tool carrier C includes a central section 20 and retractable left and right wing sections 21R and 21L which, when extended, are in a common horizontal alignment behind a tractor T and transverse to the longitudinal axis of this tractor T as shown at FIG. 1. The sections 20, 21R and 21L are tubular bars as further described, and the length and arrangement of these bars and other components is such that this tool carrier C is essentially symmetrical from each side of the vertical longitudinal center plane of the carrier and tractor, such symmetry sometimes being called "mirror symmetry." This is important to keep a balanced load upon the tool carrier and tractor during cultivation operations.

Each section 20, 21R and 21L may carry specific tools, but ordinarily the sections will carry implement bars, such as a diamond section bar, immediately behind them which, in turn, carry the implements or tools. The implements, gage wheels and the like which are used with this tool carrier are conventional and are attached to the sections in a conventional manner; hence, they are not shown. The manner in which a diamond section implement bar may be attached to the sections 20 or 21R or 21L is shown at FIG. 11 as hereinafter described.

Each tool bar section 20, 21R and 21L is a rugged, square or rectangular sectioned steel tube capable of withstanding bending and torsional forces imposed upon it by pulling implements when the wings are extended and a cultivating operation is underway. It is to be noted that the wing sections 21R and 21L will cantilever from the central section 20 when they are extended and a substantial bending action will occur on the connections between the wings and the central sections. Thus, extra heavy hinges connect these wing sections to support arms as hereinafter described.

When the wing sections 21R and 21L are extended, they are in a common horizontal alignment with the central section 20 as mentioned. When they are retracted, they will have moved upwardly and inwardly to be above the central section 20, but the wing sections will retain their hoizontal position, for each wing section is connected to the central section by a pair of parallelogram arms. Each wing section 21R and 21L will thus connect to an inward arm 22R and 22L, respectively and to an outward arm 23R and 23L respectively. These pairs of arms are suitably hinged to the central section 20 and to their respective wing sections in an arrangement which forms parallelograms, best illustrated by the showing at FIG. 2. The construction of the arms and the manner in which they are attached to the central section will now be described.

To place all components of this organization in a stacked arrangement, that is, in a vertical transverse plane with respect to the longitudinal axis of the tractor, the inward arms 22R and 22L are positioned above the tool sections 20 and 21L and 21R and the outward arms 23R and 23L are positioned below the tool sections, best shown when the tool sections are extended, FIGS. 1 and 3.

To position the inward arms 22R and 22L above the tool sections, a crown bar 24, a steel tube having a cross section the same as the central section 20, is spaced a short distance above this central section and is rigidly secured thereto by short columns 25. The crown bar 24, centered upon the central section 20, is shorter than the central section to permit the inward arms 22R and 22L to lie above this central section 20 with their inner ends hingedly connected to the adjacent ends of the crown bar 24 and their extended ends hingedly connecting with the inner ends of the respective wing sections 21R and 21L.

The inward arms 22R and 22L resist the primary bending action imposed upon the wing sections when they are in use and the hinge connections at both ends of each arm 22R and 22L also must resist this bending action. To form the hinge between the crown bar 24 and the inner end of each inward arm, 22R and 22L, each end of the crown bar 24 terminates as a comparatively heavy, transverse hinge tube 26 which extends laterally a short distance from each side of the bar. The inner ends of each inward arm 22R and 22L terminate as a comparatively heavy yoke 27 whose arms embrace the hinge tube 26 and this yoke is connected to the hinge tube 26 by a pintle 28 extending through the tube 26. The pintle is welded to the yoke arms as shown, or otherwise secured in place (see FIG. 7).

The outer end of each inward arm 22R and 22L is downturned as at 29 to lower the outer hinge position of that arm and this outer end terminates as a comparatively heavy transverse hinge tube 30 similar to the hinge tube 26 heretofore described. The inner end of each wing section 21R and 21L connects to this hinge tube 30 by a yoke 31 which is mounted directly upon the top of the wing section and the arms of the yoke are in alignment with the hinge tube 30. A pintle 32 extends through the tube 30 and is welded, or otherwise affixed, to the yoke arms.

The outward arms 23R and 23L, below their respective wing sections, do not need to withstand the loads imposed upon the inward arms and thus they may be lighter and smaller tubular members. A hinge to connect the inner end of each outward arm to the adjacent outer end of the central section 20 is formed by two downturned plates 33 at the sides of the central section 20, a hinge tube 34 affixed to the inner end of the outward arm and a pintle 35 extending through the hinge tube 34 and welded or otherwise affixed to the plates 33. The downturned plates 33 place the axis of the hinge tube 34 below the bar forming the central section 20. Also, the outward arms 23R and 23L extend downwardly from the hinge tube 34 and turn as at 36 to lie underneath the wing section 21R and 21L when that section is extended.

The outer end of each outward arm 23R and 23L extends to a position under the outer end of the wing section where the length of the arm is comparable with the length of the inward arms 23R and 23L. There the outer end of each arm is pivotally connected to its wing section through a pair of depending bars 37 attached to the sides of the wing section. A pivot bolt 38 extends from the end of each outward arm to the lower end of the bars 37 and a pintle 39 is affixed to and between these bars 37 and through the head of the pivot bolt 38. Each pivot bolt 38 includes a threaded shank 40 which extends into the end of its outward arm, and into a threaded nut 41 affixed to the outer end of the outward arm. A lock nut 42 is threaded upon this shank 40 to securely hold the pivot bolt 38 in place (see FIG. 6).

Figure 2:
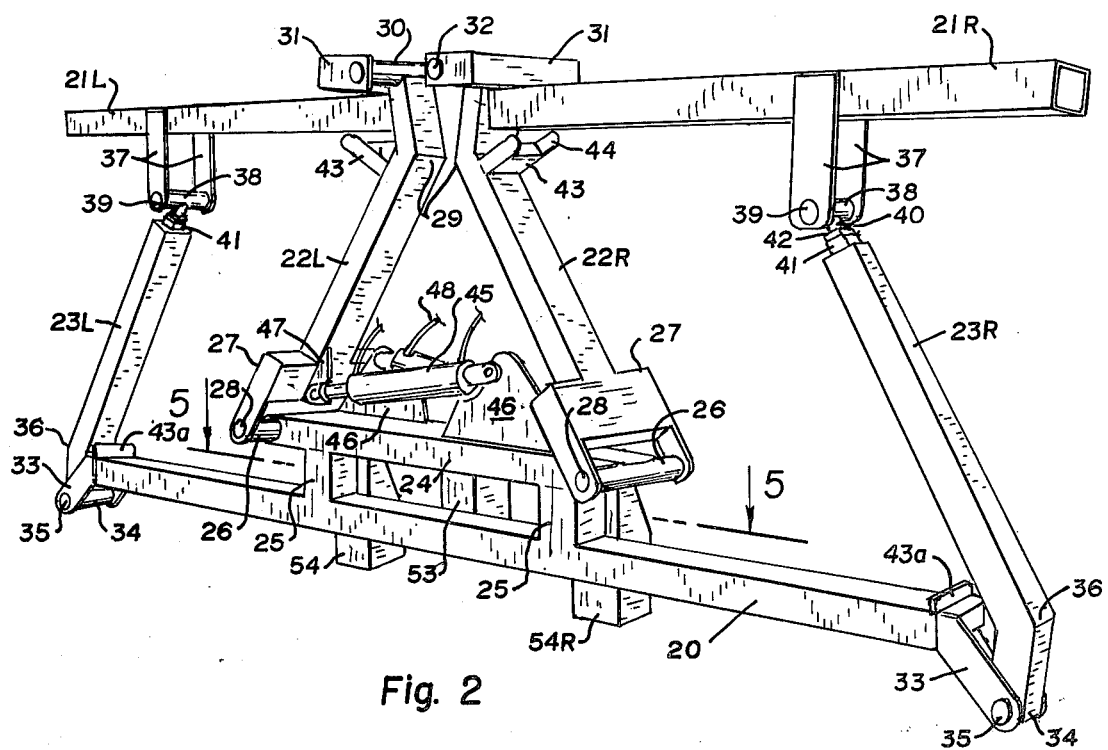
FIG. 2 is a perspective rear view of the tool carrier per se, similar to FIG. 1, but on an enlarged scale and with the wing sections of the tool carrier being retracted above the central section.
Figure 5:
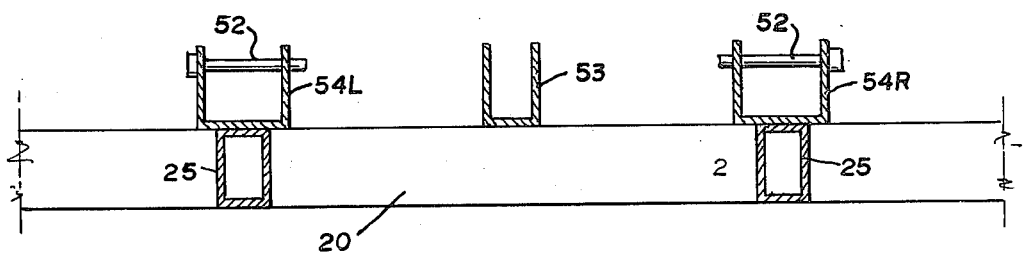
FIG. 5 is a fragmentary sectional detail as taken from the indicated line 5—5 at FIG. 2, but on an enlarged scale.

It is to be noted that the pivot axes of the inward arms 22R and 22L, at the pintles 28 and 32, and the pivot axes of the outward arms 23R and 23L, at the pintles 35 and 39, are arranged to provide for a parallelogram relationship of the central section, the wing sections and the arms connected together at these several axes points. This parallelogram relationship is maintained regardless of the position of the wing sections, whether extended or retracted, although slight variations thereto are possible by adjustments of the pivot bolt 38 in the nut 41. The result is that the wing sections 21R and 21L will always remain horizontal or nearly horizontal, whether extended or retracted. It is also to be noted that in retracting these wing sections, each will move inwardly over the central section 20 and the crown bar 24 until its inner end will touch, or almost touch, the opposite wing section, as best shown at FIG. 2. Accordingly, the length of each wing section may be approximately one-half the length of the central section to provide for a most compact arrangement when the wing sections are retracted above the central section.

To complete this general assembly, a saddle 43 is affixed to the underside of each inward arm 22R and 22L adjacent to the bend 29 to extend downwardly and to engage a key plate 43a upstanding from the central section 20 near its outer end and directly beneath the saddle 43 when the arm is lowered and its wing section is extended. Each saddle 43 has a lip 44 at its leading and trailing bottom edges which extends beyond the base of the saddle to embrace and lock upon the key plate 43a. Thus, this saddle 43 functions to transfer a significant portion of the loading and strain from the inward arms 22R and 22L to the central section 20 when pulling cultivating implements mounted on the wing sections 21R and 21L (see FIG. 8).

The wing sections are lifted from their extended positions to retracted positions by hydraulic cylinders 45 mounted upon brackets 46 upstanding from the central crown bar 24 with the piston of each cylinder extending to a connective ear 47 at the upper surface of an inward arm 22 adjacent to the yoke 27. To provide for a most compact arrangement, one cylinder 45, its bracket 46 and the ear 47 are positioned at the leading edges of the crown bar 24 and one inward arm, while the other cylinder, its bracket and the ear, are positioned at the trailing edge of the crown bar and the other inward arm, all in a simple, compact, close relationship as best illustrated at FIGS. 2 and 4. Suitable conventional hydraulic lines, generally indicated at 48, extend from these cylinders to the tractor. The structure of the cylinders 45 and of the hydraulic lines 48 are essentially conventional and need not be described in detail.

This tool carrier is attached to the three-point hitch of the tractor T as shown in broken lines at FIG. 9 The three-point hitch will include a central upper arm 50 and lower side arms 51R and 51L. Each arm extends rearwardly of the tractor and has a mounting eye at its extended end to receive a carrier pin 52. These arms, constituting a three-point hitch, can be raised and lowered by conventional controls at the tractor and they are also conventional and need not be shown or described in further detail. To attach the tool carrier to the three-point hitch, a central, vertical mounting channel 53 and side vertical mounting channels 54R and 54L are affixed to the leading face of the tool carrier. The central mounting channel 53 is attached to the center of the central section 20 and to the crown bar 24 to extend thereabove. The side mounting channels, 54R and 54L, are each attached to the crown bar 24 and to the central section 20 to depend therebelow. Each channel has a plurality of pairs of mounting holes 55 along its flanges to receive the carrier pins 52 for connection with the corresponding arms of the three-point hitch. The mounting holes 55 are arranged in vertical rows to permit selective height adjustments of the tool carrier with respect to the elevations of the three-point hitch arms. This arrangement of channels 53 and 54R and 54L and the mode of connecting them to a three-point hitch is conventional and thus need not be described further.

In operation of the tool carrier, it may be first mounted on a tractor by connecting the same with a three-point hitch. At the same time, or prior to or afterward, implement bars carrying implements, not shown, are attached to the central section 20 and wing sections 21R and 21L of the carrier C. Also, specific tools may be attached directly to the bars constituting the central section 20 and the wing sections 21R and 21L.

The attachement of cultivating implements to the tool carrier will require the use of square, rectangular, or diamond-section implement bars depending upon the implement connector clamps available. Although any of these implement bars may be connected to the tool carrier, the diamond-section bar is shown in the drawings. FIG. 10 illustrates a simple mode for mounting a diamond-sectioned bar 60 onto the wing section 21L of the carrier. The diamond-section bar 60 is essentially of the same length as the wing section 21L. A U-bolt 61, near each end of the wing section 21L, extends over the section to lock a mounting angle 62 in position, the ends of the U-bolt extending through suitable holes in one of the flanges of the angle. An angle extension 63, attached to each mounting angle 62, cantilevers from the wing section 21L to carry a diamond bar mounting bracket 64 at its extended end, the bracket being held in position by suitable mounting bolts 65. Once the diamond bar 60 is mounted in the brackets 64, various implements may be attached to the diamond bar 60.

The improved tool carrier C is especially suitable for carrying implement bar assemblies, that is, implement bars which have the implements mounted on them and ready for use. The basic purpose of such implement bar assemblies is to provide a quick method for mounting different implements on the carrier to perform various planting, chemical application or cultivating operations. For example, one set of bars may be provided with plows or chisels, another set with seeders and a third set with cultivating implements. When used with the improved tool carrier, a set of implement bars will include a bar assembly for the central section 20 and one for each wing section 21R and 21L. The present invention thus contemplates the provision of an improved quick connect coupler K for attaching an implement bar to a section of the tool carrier.

A bar assembly 70 is provided which carries a pair of shoes 71 of two spaced couplers K. The mating lock plates 72 of the couplers are illustrated at FIGS. 11 and 12 as being affixed to a wing section 21R of the carrier and it is understood that the same structure would be used with the other sections. In the figures, the shoe 71 and the lock plates 72 are spaced apart a short distance to better illustrate their constuction. The manner in which they are coupled together is quite apparent.

The bar assembly 70 is formed by interconnecting forward and rearward, diamond type tool bars 73 with spacer bars 74, the spacer bars 74 having their ends notched to receive the diamond bars and end caps 75 to hold the bars in place. Any arrangement of tools, implements, or gage wheels, not shown, may be affixed to the bars 73.

The shoes 71 at the forward, leading edge of the bar assembly are attached to the forward tool bar 73 by a mounting bracket 77 and are formed as upright channels with comparatively deep flanges 78 extending forwardly from the back web of the channels. The edges of the channels are flared as at 79. An upper and lower bolt 80 extends through the flanges of each shoe adjacent to the flared edges thereof to receive hooks on the lock plate 72. An intermediate hole 81 extends through each flange for receiving a lock pin once the lock plate is connected.

Each lock plate 72 is formed as an upright member outstanding rearwardly from the trailing edge of the wing section 21R to which it is attached. It is welded upon a mounting plate 82 which lies against the trailing edge of the wing section 21R. A backing plate 83 is provided to lie against the opposite side of the wing section and bolts 84 extend through suitable holes in these plates to secure the assembly to the wing section. The lock plate 72 is provided with two extended hooks which outstand from the trailing edge of the lock plate 72. Each hook provides a crotch wherein the bolts 80 will fit when the two sections are coupled. The hooks are pointed to facilitate easy movement to a proper position when the components of the coupler K are coupled. The width of the shoe between the flanges 78 is sufficient to permit the lock plate to easily move into place and a guide wing 86 outstands from each side of the lock plate to facilitate centering it in place within the shoe even when the lock plates are tipped sideways because the tool bar is not perfectly horizontal. The underside of the upper hook point 85, outstanding from the plate 72, forms a shoulder 87 which is directly above the holes 81 in the shoe and accordingly, when the coupler components are properly coupled, a suitable pin, not shown, may be inserted into these holes to lock the components together and they cannot be disconnected until the pin is removed.

FIG. 13 illustrates, more specifically, the advantageous arrangement of down-sloping the alignment between the hinging points of the inward arms 22R and 22L and the corresponding alignment between the hinging points of the outward arms 23R and 23L as hereinbefore disclosed. The purpose is to gain height when the wing sections 21R and 21L commence to move upwardly and over the central section 20. This is desirable to avoid an accident when the wing section commences to move upwardly and over the central section because the bottom of a cultivating implement, located near the inner end of a wing section could srike the top of a cultivating implement located near the outer end of the central section 20. Referring to FIG. 13, it is to be noted that the pintle 28, connecting the inward arm 22L to the crown bar 24, is above the pintle 32 connecting the inward arm 22L to the wing section 21L. Likewise, the pintle 35, connecting the outward arm 23L to the central section 20, in above the pintle 39 connecting the outward arm to the wing section 21L. To attain this height difference, the pintle 39 is located at the bottom of the depending bars 37. Accordingly, when the wing section 21L is in horizontal alignment with the central section 20, in alignment 90, between the pintles 28 and 32, and the alignment 91, between the pintles 35 and 39, are downsloped in spaced parallelism. It follows that whenever the wing section 21L commences to move upwardly and over the central section 20, the first portion of the movement will be outwardly a slight distance and upwardly a significant distance depending upon the downslope between the respective pintles at the opposite ends of the arms 22L and 23L. This distance, indicated as 'h' at FIG. 13, permits the implements attached to the wing section to be raised upwardly a distance sufficient to clear implements on the central section before moving over the central section to the retracted position. The net result is that by sloping the pivot points between the opposite ends of the arms 22L and 23L, the length of the arms 22L and 23L may be decreased and the overall height of the tool carrier, when the wing sections are retracted above the central section, need not be as great as otherwise. Moreover, the parallelogram action between the arms, the central section and the wing section is not altered by sloping the pivot points between the ends of the arms.

I have now described my invention in considerable detail. However, it is obvious that others skilled in the art can build and devise alternate and equivalent constructions which are, nevertheless, within the spirit and scope of my invention. Hence, I desire that my protection be limited, not by the constructions illustrated and described, but only by the proper scope of the appended claims.

What is claimed is:

1. A folding tool carrier having a single bar forming a central section and single bars forming wing sections, at each side of the central section, said wing section bars normally extending horizontally, in a substantial, longitudinal alignment with the central section bar, said sections being adapted to hold agricultural implements and the like, said tool carrier comprising:
   (a) an inward arm directly above each side of the central section and having a greater elevation than the adjacent wing section when it is extended, with the inner end of each inward arm pivotally connecting with the central section at a point near the central portion of the central section and the outer end of each inward arm pivotally connecting with the inner end of the adjacent wing section;
   (b) an outward arm directly below each wing section when the wing section is extended, with the inner end of each outward arm pivotally connecting with the adjacent end of the central section and with the outer end of each outward arm pivotally connecting with the wing section at a point near the outer end of, and below, the wing section; and
   (c) means to swing the arms upwardly and over the central section to retract each wing section upwardly and over the central section.

2. The tool carrier defined in claim 1, wherein:
the length of each inward arm, the length of each corresponding outward arm and the locations of the pivot connections of these arms on the central section and on the respective wing section define, essentially, a parallelogram when moving the wing section from its extended position to its retracted position above the central section, whereby each wing section remains essentially horizontal and parallel to the central section at all positions.

3. The tool carrier defined in claim 2, wherein:
the alignment between the pivotal connections at the opposite ends of each of the arms is inclined with respect to the normal horizontal alignment of its wing section, with said inclination being downwardly and outwardly, whereby to define an upward and outward path of movement as the wing section commences to move upwardly and over the central section, whereby the facilitate the clearance of adjacent implements carried by the central section and the wing section.

4. The tool carrier defined in claim 1, including:
a crown bar mounted above the central portion of the central section; and wherein
each aforesaid pivot connection connecting the inner end of an inward arm to the central section is located at an end of this crown bar.

5. The folding tool carrier defined in claim 4, wherein the means to swing the arms upwardly includes:
   a bracket upstanding from the top of the crown bar, near one end thereof;
   a cylinder attached to the bracket having its piston extended beyond the other side of the crown bar; and
   a connector ear upstanding from the inward arm at the opposite side of the crown bar and connecting with the piston; and wherein
   the brackets, cylinder and connective ear for one inward arm is mounted alongside one edge of the crown bar to provide space for an opposing bracket, cylinder and ear at the other edge of the crown bar to connect with the opposite inward arm.

6. The tool carrier defined in claim 4, wherein:
each inward arm includes a saddle at its underside adapted to rest upon the top of the central section when the wing section and inward arms are extended; and
lips at the edges of the saddle to grip the central section whereby the transfer to the central section a portion of the bending moments and other loading imposed upon the inward arm by the wing section.

7. The tool carrier defined in claim 4, wherein each pivot connection of the inner arm to the crown bar and to the wing section includes:
   a pivot tube transversely affixed to the end of one member;
   a yoke affixed to the end of the other member with its legs embracing the end of the pivot tube; and
   a pintle extending through the pivot tube with each end affixed to a leg of the yoke.

8. The tool carrier defined in claim 4, wherein:
the axis of the pivot connection of the inward arm to the wing section is above the wing section; and
the axis of the pivot connection of the outward arm to the wing section is below the wing section.

* * * * *